United States Patent [19]

Chyung et al.

[11] Patent Number: 4,622,057

[45] Date of Patent: Nov. 11, 1986

[54] PROCESS FOR MAKING THICK-WALLED CERAMIC BODIES FROM SYNTHETIC MICAS

[75] Inventors: Kenneth Chyung; Thomas J. Dwyer, both of Painted Post; Gordon F. Foster, Campbell; Robert D. Shoup; Roger A. Young, both of Corning, all of N.Y.

[73] Assignee: Corning Glass Works, Corning, N.Y.

[21] Appl. No.: 734,917

[22] Filed: May 16, 1985

Related U.S. Application Data

[63] Continuation of Ser. No. 471,539, Mar. 2, 1983, abandoned.

[51] Int. Cl.$^4$ .............................................. C03B 19/06
[52] U.S. Cl. ......................................... 65/18.1; 65/17; 501/12
[58] Field of Search ............... 65/17, 18.1, 18.2, 18.3, 65/30.13; 501/12

[56] References Cited

U.S. PATENT DOCUMENTS

| | | | |
|---|---|---|---|
| 2,268,589 | 1/1942 | Heany | 65/18.2 X |
| 3,678,144 | 7/1972 | Shoup | 106/40 X |
| 4,239,519 | 12/1980 | Beall et al. | 65/30.13 X |
| 4,293,439 | 10/1981 | Corbett et al. | 501/12 X |
| 4,442,175 | 4/1984 | Flannery et al. | 65/17 X |
| 4,443,239 | 4/1984 | Biswas et al. | 65/18.1 X |
| 4,472,185 | 9/1984 | Wu | 501/12 X |

*Primary Examiner*—Kenneth M. Schor
*Attorney, Agent, or Firm*—C. S. Janes, Jr.

[57] ABSTRACT

The instant invention is directed to the production of boards and other relatively thick-walled shapes of various configurations from inorganic silicates. The method for preparing such products involves five general steps: first a fully or predominantly crystalline body is formed containing crystals consisting essentially of a lithium and/or sodium water-swelling mica selected from the group of fluorhectorite, boron fluorphlogopite, and solid solutions therebetween; second, that body is contacted with a polar liquid, customarily water, to cause swelling and disintegration of the body accompanied with the formation of a gel; third, the gel is contacted with a source of large cations to effect an ion exchange reaction between the large cations and the $Li^+$ and/or $Na^+$ ions in the gel and to cause flocculation of the gel; fourth, the floc is substantially separated from the polar liquid and a shape of a desired geometry formed therefrom; and, fifth, the shaped body is fired at a temperature in excess of 700° C., but below about 1100° C., to minimize the normal hygroscopic tendencies in the materials.

15 Claims, No Drawings

PROCESS FOR MAKING THICK-WALLED CERAMIC BODIES FROM SYNTHETIC MICAS

This is a continuation of application Ser. No. 471,539 filed Mar. 2, 1983 and now abandoned.

BACKGROUND OF THE INVENTION

The invention relates to forming relatively thick-walled bodies from synthetic micas. A thick-walled body is not restricted as to configuration, but, characteristically, has a wall thickness greater than about ten mils. This differentiates between articles such as wall board, electronic substrates and catalyst carriers on one hand, and paper and film products on the other.

U.S. Pat. No. 4,239,519 (Beall et al.) is directed to the preparation of inorganic gels from which ceramic papers, fibers, films, boards, and coatings can be made. The basic method for preparing those gels contemplates three general steps: (1) a fully or predominantly crystalline body is formed containing crystals consisting essentially of a lithium and/or sodium water-swelling mica selected from the group of fluorhectorite, hydroxyl hectorite, boron fluorphlogopite, hydroxyl boron phlogopite, and solid solutions among those and between those and other structurally compatible species selected from the group of talc, fluortalc, polylithionite, fluorpolylithionite, phlogopite, and fluorphlogopite; (2) that body is contacted with a polar liquid, desirably water, to cause swelling and disintegration of the body accompanied with the formation of a gel; and (3) the solid:liquid ratio of the gel is adjusted to a desired level depending upon the application therefor.

Papers, fibers, films, boards, and coatings are prepared from the gel. To impart good chemical durability thereto, these products are subsequently contacted with a source of large cations, commonly $K^+$, $Rb^+$, $Cs^+$, $NH_4^+$, $H_3O^+$, $Ca^{+2}$, $Sr^{+2}$, $Ba^{+2}$, $Ag^+$, $Cu^+$, $Mg^{+2}$, $Pb^{+2}$, or organic polycations. This causes an ion exchange to take place between the large cations and the $Li^+$ and/or $Na^+$ ions from the interlayer of the crystals. Thereafter the ion-exchanged products are dried. Glass-ceramic bodies are statedly the preferred crystalline starting materials for gel formation.

The patent discloses laying up, stacking, or otherwise depositing several films or sheets one upon the other and thereafter drying the resulting composite, optionally with pressing, to form board. The patent also observes that wet gel, after flocculation via the above-described ion exchange reaction, can be pressed and dried into board or other configuration. Further experience with these techniques demonstrated that the first approach required much handling of the material, and that the resultant board frequently suffered delamination along the planes between the stacked layers. The second technique provided board of less laminar character, but the strength thereof rapidly decreased in atmospheres of relatively high humidity.

OBJECTIVES OF THE INVENTION

A primary objective is to provide an improved method of forming thick-walled ceramic bodies from ion-exchanged floc, as described in U.S. Pat. No. 4,239,519.

A further objective is to provide a method of treating the bodies to render them essentially nonhygroscopic.

Another objective is to provide bodies which do not undergo drastic strength reduction after forming.

Still another objective of the invention is to provide inorganic silicate board and other shapes that display mechanical properties approaching those of soft wood, such as eastern pine, in terms of stiffness, strength, and flexibility.

A still further purpose is to provide board that can be nailed and worked with hand tools in a similar manner to wood.

Another objective of the invention is to provide a method for making such board and other shapes which is relatively simple and does not involve an intermediate product such as film or paper.

SUMMARY OF THE INVENTION

We have determined that those objectives can be attained by utilizing a starting material wherein a synthetic, lithium and/or sodium, water-swelling mica, selected from the group of fluorhectorite and boron fluorphlogopite, and solid solutions among those and between those and other structurally compatible species selected from the group of talc, fluortalc, polylithionite, fluoropolylithionite, phlogopite, and fluorphlogopite, constitutes the principal crystal phase. U.S. Pat. No. 4,239,519, supra, discloses preferred composition ranges, where a fluorhectorite is the desired predominant crystal phase, as consisting essentially, expressed in weight percent on the oxide basis, of 0.5–10% $Li_2O$ and/or 2–10% $Na_2O$, 0.5–14% $Li_2O+Na_2O$, 15–32% $MgO$, 50–70% $SiO_2$, 0–5% $Al_2O_3$, 0–10% $B_2O_3$, and 4–12% F, and, where a trisilicic boron fluorphlogopite comprises the desired predominant crystal phase, as consisting essentially, expressed in weight percent on the oxide basis, of 0.5–6% $Li_2O$, 0–9% $Na_2O$, 0.5–10% $Li_2O+Na_2O$, 20–38% $MgO$, 2–10% $B_2O_3$, 0–10% $Al_2O_3$, 4–12% $Al_2O_3+B_2O_3$, 35–56% $SiO_2$, and 4–12% F.

In the broadest terms, the inventive method contemplates producing a synthetic mica body having a composition as defined, and treating that body according to the following steps:

First, particles of the material are contacted with water or other polar liquid to cause swelling and disintegration of the particles accompanied with the formation of a gel;

Second, the gel is contacted with large cations to effect an ion exchange between the $Li^+$ and/or $Na^+$ ions of the mica gel and the larger cations and cause flocculation of the gel;

Third, the floc in the flocculated gel is substantially separated from the bulk of the fluid, Fourth, the floc is shaped or molded to desired form, and Fifth, the formed floc is fired at a temperature in excess of 700° C., but not in excess of 1100° C., to eliminate hygroscopic behavior of material.

It will be appreciated that the first and second steps in the above method may be either concurrent or consecutive. Thus, the mica particles may be contacted directly with water or other polar liquid containing the large cations utilized in the ion exchange reaction. The quantity of large cations required to promote essentially complete flocculation can be predetermined and that amount incorporated in the initial solution. This direct, one-step preparation of flocculated gel is described in greater detail and claimed in U.S. Pat. No. 4,453,981 granted in the name of Mark Taylor.

Alternatively, the polar liquid may contain a small amount or no large cations therein. In that case, the large cations are added after gelation has occurred. This technique provides the option of washing the floc to at least remove a major proportion of the free cations before draining and drying the floc for further processing.

The floc may be used for molding in the form in which it is separated from the flocculated gel. Alternatively, it has been found desirable, especially where filtration forming is involved, to redisperse the floc in a liquid to provide a concentration of 5 to 20% solids.

A number of different molding or shaping procedures are available. These include (a) casting and drying, (b) vacuum filtering and drying, (c) filter pressing, (d) dry pressing and (e) extrusion.

The firing temperature is vital in producing articles essentially free from hygroscopic behavior but still retaining the desired flexibility and machinability. Hence, temperatures in excess of 700° C. are demanded to reduce hygroscopic tendencies, and higher temperatures are generally more effective. Nevertheless, excessive firing tends to destroy the desired mechanical properties. Accordingly, temperatures much in excess of about 1100° C. must be avoided, and we prefer to fire at 850°–950° C.

GENERAL DESCRIPTION OF THE INVENTION

As indicated, the basic material of this invention may be supplied as disclosed in U.S. Pat. No. 4,239,519.

Two methods are described therein for forming highly crystalline glass-ceramic bodies. One, which utilizes a conventional three-step process for preparing glass-ceramic bodies, contemplates:

(a) melting a batch comprising the necessary constituents in the proper stoichiometry to obtain a lithium and/or sodium, water-swelling mica selected from the group of fluorhectorite, hydroxyl hectorite, boron fluorphlogopite, hydroxyl boron phlogopite, and solid solutions among those and between those and other structurally compatible species selected from the group of talc, fluortalc, polylithionite, fluorpolylithionite, phlogopite, and fluorphlogopite;

(b) simultaneously cooling the melt to a temperature at least within the transformation range thereof and, typically, below the transformation range, and forming a glass article therefrom; and (c) heat treating the glass article between about 700°–1200° C. to develop the desired crystals therein.

A second method, capable of producing a spontaneous glass-ceramic body, also involves three elements:

(a) melting a batch having the required ingredients in the proper stoichiometry to secure a lithium and/or sodium water-swelling mica selected from the group as defined in the first method;

(b) simutaneously cooling the melt to a temperature between about 900°–1050° C. to shape the melt into a glass body and to cause phase separation and nucleation to take place therein; and then (c) further cooling the glass body to a temperature between about 700°–900° C. and maintaining that temperature for a sufficient length of time to develop the desired crystallization therein.

This latter method for producing glass-ceramic articles provides two practical advantages when compared with the conventional process which is founded in the reheating of precursor glass articles. First, the rate of production is much faster than in the conventional process. Second, less stable glasses, i.e., glass compositions which are prone to devitrify readily, can be utilized. Unfortunately, the method does not permit close control of crystal size. Further, undesirable crystal phases may develop, and volatilization losses may be incurred. This requires more care to be taken to insure essentially complete gelation and flocculation of the crystalline material.

The patent further discloses a method which involves the hydrothermal treatment of anhydrous glasses and glass-ceramics to form analogous hydroxyl micas. In general, the method is similar to the glass-ceramic methods, except that the compositions are usually low fluoride or fluoride free. Also, the body formed is subsequently exposed to a water-containing, gaseous atmosphere of at least 50 relative humidity at temperatures in the range of 200°–400° C. for sufficient time to develop crystals that are the hydroxyl equivalents of the effective lithium and/or sodium micas.

We have found that the hydroxyl equivalents tend to undergo change and lose the hydroxyl component at temperatures above 500° C. Hence these materials are not equivalent for present purposes, and are hereafter excluded.

Finally, it is disclosed in Bureau of Mines Bulletin 647 (1969) that a sintered reaction product may be used to prepare a gel. For present purposes then, the basic ingredient is a gel containing crystals of a synthetic, lithium and/or sodium, water-swelling mica selected from the group of fluorhectorite, boron fluorphlogopite, and solid solutions among such crystals and between those and other species as earlier recited. This gel may be produced from a conventional glass-ceramic, a spontaneous glass-ceramic, or a sintered reaction product, each of suitable composition.

It has previously been noted that U.S. Pat. No. 4,239,519 discloses that wet gel, after flocculation by ion exchange, can be pressed and dried to form board. The product, while possessing adequate strength as formed, tended to lose that strength rapidly, particularly under conditions of high humidity.

We have now found that the hygroscopic nature of the pressed mica board or other shape may be essentially eliminated by firing the body at an elevated temperature of at least 700° C. Temperatures below about 850° C. are effective where a soft frit is included as an additive. Absent such additive, temperatures of at least 850° C. are required and the range 850°–950° C. is preferred. Higher tempertures up to about 1100° C. may be employed, but generally add little benefit and tend to deteriorate the mechanical properties. In particular, the board becomes quite brittle and fragile.

The full explanation of this phenomenon is not completely clear. However, we believe that the ion-exchanged, synthetic mica crystals undergo sintering, or similar thermal consolidation, during firing. In any case, there is a change of some nature which renders the fired body much more resistant to moisture absorption, especially under humid conditions.

It is possible to reduce the firing temperature as low as 700° C. by mixing a comminuted low temperature frit with dry powdered floc prior to shaping and firing. The frit appears to coat the mica crystals.

For present purposes, a fluorhectorite or boron trisilicic fluorophologopite body may be prepared as heretofore described and placed in a polar liquid to swell, disintegrate and form a gel. After suitable homogenization, the gel may then be extruded into a potassium chloride solution. This breaks the gel and flocculates the dispersed mica by ion exchange, and consequent ionic charge on the mica platelets. The mica floc may be washed if it is desired to remove the alkali metal salts (lithium and/or sodium from the exchange and excess potassium). It is then at least separated from liquid by decantation, filtration or other means.

The damp floc may be collected in desired form, as by vacuum filtration, and then dried and fired. It has been found, however, that a finer separation of the floc, and consequent ease of handling, is achieved by redispersing the damp floc.

At any point in forming and processing the floc, prior to molding, additives may be incorporated as desired. These include materials such as alumina, silica, zeolites and the like, as well as fillers, which may be present in amounts ranging up to 75% or so in catalyst support structures for example. Thus, the additives may be mixed in the gel for initmate dispersion with the floc. If this is not convenient, they may be incorporated in the floc during redispersal for example.

Once the floc has been redispersed, it may be collected into a formed body such as a board by various molding techniques. Perhaps the simplest technique, but also the slowest, is casting and drying. This involves simply pouring the flocculated gel in a mold and allowing it to settle. The supernatant liquid may be decanted.

For this technique, a gel with solids content of about 5 to 15%, preferably about 10%, is desirable. With a high solids content, particle orientation, and consequent strength, suffer. Also, shrinking and cracking tend to occur on drying. A big disadvantage of this technique may be retention of all ion exchange salts.

Filtration tends to remove some of the salts as well as liquid. It may be facilitated by application of a vacuum, as in well-known vacuum filtration arrangements. It may also be facilitated by application of pressure to the cake formed on the filter, preferably uniaxially applied. Normally, the filtermay be so shaped as to be a suitable mold for the article to be produced. In either type of filtration, controlled particle orientation, drainage and forming can be achieved in one combined operation.

Dry pressing usually involves providing the floc in relatively dry, particulate form. The dried material may be milled, mulled, or otherwise subdivided and mixed with a binder for dry pressing. However, perhaps the most efficient continuous procedure is spray drying. In known manner then, the dry particles may be mixed with a binder, which may be water or one of the well-known organic binders, and pressed to desired form. Bodies formed in this manner have shown little preferred particle orientation and hence lower strength.

The vaccum forming procedure tends to provide good orientation and resulting strength. However, it may be limited as a continuous forming process because of the time required for dewatering. This is particularly true as interest moves toward thicker walled bodies. Also, reshaping operations, as in dish or bowl molding, may lead to weak zones and/or breaks. Accordingly, extrusion as a forming technique was explored.

The extrusion process generally employs floc that has been washed to remove salts, drained, and then dried to less than 5% water content. The dried floc may then be comminuted, as by grinding and sieving, if desired. Alternatively, the floc may be obtained in particulate, relatively dry form by spray drying, and this appears more practical for a commercial operation.

The dried floc particles may be mixed with other ingredients in particulate form. For example, they might be mixed with coating frit, as mentioned earlier, with cellulating agents, or with an active species which could act as a support structure in catalysis.

The floc, with or without additives, is then mixed with a suitable binder. Water and/or methyl cellulose are commonly used. In the case of support structures, where additives, such as alumina, silica, and zeolites, may be in large amount, unexchanged gel may be employed as a binder. This may subsequently be exchanged with excess larger ions, or may remain unexchanged in minor amount.

Once suitably formulated, the mix may be mulled to a dough to de-air the batch. Also, it may be run through a spaghetti extruder to improve homogeneity.

A suitable die, depending on ultimate product, is then provided on the extruder and a final extrusion made. The shape extruded may for example be a honeycomb, a ribbon, a tube, or a rod. Extrusion pressures may vary between one and ten thousand lbs. depending on water content. It would appear that injection molding could be carried out with equal success.

It has been observed that extruded catalyst carriers may have unique surface charge effects whereby the charge is positive along the edge and negative on top and bottom surfaces. Such bodies lend themselves to unique catalyst dispersions as evidenced by attachment of colloidal gold along the positively charged edge.

DESCRIPTION OF PREFERRED EMBODIMENTS

In the following laboratory studies, a glass-ceramic consisting essentially, in parts by weight as calculated from the original batch ingredients, of

| | |
|---|---|
| $SiO_2$ | 64.4 |
| MgO | 10.8 |
| $Li_2O$ | 8.0 |
| $MgF_2$ | 16.7 | comprised the starting material. That composition represents stoichiometric lithium fluorhectorite.

The batch components therefor were compounded, ballmilled together, and then charged into a platinum crucible. A lid was placed onto the crucible, and the crucible introduced into a furnace operating at 1450° C. After melting for five hours, the molten glass was poured onto a steel plate to produce a glass slab about 0.5″ in thickness, and this slab was immediately transferred to an annealer. The glass slab was converted to a glass-ceramic body utilizing the conventional method therefor, viz., reheating a precursor glass body. In this instance, the glass slab was heated to 700° C. at a rate of about 5° C./minute, and held at that temperature for four hours. Electron microscopic examination of the body showed it to be highly crystalline with the crystals, themselves, being fine-grained (<5 microns). X-ray diffraction analysis determined the principal crystal phase to be lithium fluorhectorite with minor amounts of quartz, amphibole, and lithium disilicate.

A procedure employed in making board or other thick-walled articles of different configurations is outlined below in specific detail:

(a) the glass-ceramic was immersed into deionized water and allowed to remain therein overnight;

(b) the swelled material (gel) was stirred, allowed to stand for about ten minutes, and then decanted off;

(c) the decanted portion (if very fluid) was carefully evaporated to a viscosity of about 100 centipoises and run into a relatively concentrated aqueous solution of a salt of a large cation, e.g., a 2N potassium chloride (KCl) solution;

(d) after a period of 24 hours, the floc was collected and washed several times with deionized water to remove the excess KCl solution;

(e) the floc was redispersed in an aqueous solution to produce a slurry of about 4–12% by weight solids;

(f) the slurry was vacuum filtered to form a body having the shape of a board or other geometry;

(g) the body was dried in the ambient environment, or, preferably, in an oven operating at a temperature not in excess of about 100° C., to leave a water content therein of less than about 10% by weight, desirably about 5%;

(h) the body was optionally pressed or subjected to other forming means; and (i) the body was dried and fired to a temperature greater than 700° C., but less than 1100° C., preferably 850°–950° C.

Several features of the recited procedure contributed to improved physical properties observed in the final products:

(1) vacuum forming provided an orderly method to withdraw the water without disturbing particle alignment and, where fine mesh screens were employed, permitted smooth surfaces to be obtained on the resident body;

(2) pressing or other reshaping of the filter cake imparted tougher and smoother skin surfaces and increased the mechanical strength of the body; and (3) firing of the body nearly eliminated the hygroscopic character thereof and enabled retention of improved mechanical strengths derived from pressing or other reshaping technique.

Pressing has been found to impart the greatest improvement in strength to vacuum-formed boards or other shaped articles. The water content of the filter cake must be carefully controlled, however. Too high a water content leads to excessive flow and the development of fissures, whereas too low levels of water result in little or no change in wall thickness of the body. A water content of about 5% by weight has been found to be very satisfactory.

Various operable pressing techniques have included:

(a) Static pressing utilizing molds, or without molds but pressing on smooth, non-stick surfaces. Pressures of up to 30,000 psi have been employed with as much as a 50% reduction in wall thickness being observed at that value. A 32% reduction in wall thickness was measured at 5000 psi pressing pressures with a 100% increase in mechanical strength, expressed in terms of modulus of rupture (MOR) and tensile strength, over unpressed, vacuum-formed board being noted at that pressing pressure.

(b) Calendering with pressures up to 2000 pounds per linear inch (P.L.I.) has caused a 33% reduction in thickness in a single pass and up to a 41% reduction upon three passes through the rollers. About a 50% increase in mechanical strength was imparted through calendering.

(c) Another reshaping practice involves the smearing out of the surface of a board under pressure in such a manner that there is very little or no change of particle orientation in the core portion. This phenomenon may be occurring to some extent in the calendering process as well. This technique implies that higher water contents in the surface than in the core portion would be an effective mode for achieving this surface re-orientation. The core, of course, is subjected to pressure which would lead to increased mechanical strength. This technique permits the pressing force to be continuously varied from a high to low level, thereby simulating a hammer-like motion. The use of an ultrasonic vibrator can produce the same phenomenon.

A series of test bars was prepared following steps (a) through (g) of the board-making procedure outlined earlier. Two sets of samples were segregated, and one sample in each set was tested without further treatment. Each of the remaining members was subjected to pressure (step h) to ascertain what, if any, effect this would have on strength. In order to isolate the pressing effect, the samples were not fired beyond the 100° C. drying temperature. Further, they were stored and tested at 0% relative humidity to avoid hygroscopic influences.

TABLE I records the relevant data and measurements for each sample. The two sets are indicated by A and B; the first member in each set is the unpressed comparison member. The pressure applied to each of the other samples is shown in psi. MOR and Tensile Stress represent the strengths measured in each case.

TABLE I

| Sample | Pressure Applied (psi) | MOR (psi) | Tensile Stress (psi) |
| --- | --- | --- | --- |
| A1 | 0 | 4380 | 1160 |
| A2 | 10,000 | 6610 | 3120 |
| A3 | 10,000 | 6800 | 3390 |
| A4 | 20,000 | 7670 | 3220 |
| A5 | 20,000 | 8100 | 4380 |
| A6 | 32,000 | 8180 | 3540 |
| B1 | 0 | 3790 | 1620 |
| B2 | 5,000 | 8000 | 3830 |
| B3 | 10,000 | 8310 | 3440 |
| B4 | 20,000 | 7520 | 3480 |
| B5 | 30,000 | 6100 | 3570 |

TABLE II reports modulus of rupture value comparisons between (1) unfired, but dried, filter cake samples which had been calendered via two passes through rolls applying pressure at about 600 pounds per linear inch (P.L.I.) and (2) samples which had not been calendered. In the first section of the table, calendered (Ex. 13) and uncalendered (Ex. 12) samples are compared in the unfired state, both at 0° R.H. and 75% R.H. In the second part of the table, the same comparisons are made, but the samples have been fired at 850° C.

TABLE II

| Sample No. | Calendered | 0% RH | 75% RH |
| --- | --- | --- | --- |
| | | MOR (psi) of Unfired Samples | |
| 12A | No | 5000 · | 00 |
| 13A | Yes | 6000 | 1000 |
| | | MOR (psi) of Fired (850° C.) Samples | |
| 12B | No | 2000 | Cracked |
| 13B | Yes | 4000 | 4000 |

The precipitous loss of strength observed at 75% relative humidity with the uncalendered/unfired sample (No. 12A) is believed due to extensive water absorption leading to highly plastic behavior and hence virtually no strength. Even the calendered but unfired (No. 13A) sample showed severe strength degradation from ~6000 psi at 0% to ~1000 psi at 75% R.H.

On the other hand, the uncalendered/fired sample (No. 12B) developed fissures and cracks during firing due to uneven and excessive shrinkage of the filter cake. Much less shrinkage takes place in the calendered sample (No. 13B) during firing, which retains its strength under high humidity conditions.

The vacuum filtration technique may be employed in producing any shape for which a suitable mold can be provided. For example, a box-like structure was produced with a perforated mold similar to a vessel used in washing fruit and vegetables. The openings were directed inwardly rather than outwardly. The perforated mold was fabricated from stainless steel and covered with a double layer of screening. Thus an initial or inner layer of standard aluminum window screening was covered with a 400 mesh (37 micron openings) metal screen. The mold was then covered with a flat metal plate fitted with a valve for applying a vacuum.

The surface of the mold was sprayed with a standard mold release compound. The mold was then inserted into a floc slurry prepared as described above in the initial "conventional" manner. The slurry was thoroughly mixed in a high shear blender to insure homogeneity just prior to the immersion of the mold therein. A vacuum (<20 mm Hg) was then applied for about 10 minutes. Thereafter, the mold was removed from the slurry, inverted, and the vacuum continued for an additional 20 minutes. It was estimated that the water content had been reduced by 40% and the thickness of the filter cake had been reduced by 60% by the vacuum application.

The filter cake which has been deposited above the screening was manually removed with a steel spatula and the mold then introduced into an oven having a moving air atmosphere and operating at 95° C. After an exposure of about six hours, the mold was withdrawn from the oven and the shape removed from the mold with little difficulty. The shape was fired to a temperature of 880° C. with no visible indication of sagging.

The extrusion process started with washed floc from the lithium fluorhectorite gel prepared for vacuum filtration. The washed floc was dried to less than 5% water and then ground and sieved. Water was the primary plasticizer used in the extrusion batches. It was added after drying the floc thoroughly so that a degree of controlled mold wetting was obtained. Levels of 20 to 50 wt. % water were added with 33% being a commonly used quantity.

Methyl cellulose was added as a solution up to a concentration of 0.5 wt. %. Above this level, the powder was blended into the dry hectorite powder before adding the desired amount of water. The binding properties (for green strength) of methyl cellulose were more important for extruding honeycomb structures than for ribbon, tubes or rods. Up to 5 wt.% methyl cellulose concentrations were included in various extrusion batches.

After completion of the additions and mulling, the material had the consistency of dough or putty. It was then extruded four times into spaghetti strands which improved homogenization and helped de-air the batch.

The extruding apparatus was a typical hydraulic piston type extruder with exchangeable dies. The die head employed for extrusion depended on the desired configuration. Among the various shapes extruded were a honeycomb tubular construction, ⅛" to ¼" thick ribbon, ¼" cane, and ¾" tubing with ⅛" wall. Extrusion pressures varied from 1000 to 10,000 lbs. Water content seems to be the controlling factor for the extrusion pressure. The flexible shape is extruded continuously and then dried.

Drying varies according to the sample shape and thickness. Microwave drying is required to maintain configuration integrity of honeycomb structures. The thin walls of the complex honeycomb structure tend to warp and become "unglued" if just allowed to dry at room temperature.

If the body is flat such as a ribbon, then pressure can be applied to the body to improve its overall strength. Pressures up to 10,000 psi have substantially improved flexural strengths.

After drying, the body can be fired to 850° C. for up to 4 hours to cause sufficient sintering to destroy most of the natural hygroscopicity of the potassium fluorhectorite.

Strength (MOR) measurements were typically made on a series of six samples so that an average value could be obtained. The strengths are reported as such. TABLE III shows a sampling of the best results that were obtained to date.

TABLE III

| Methocel (%) | Average MOR (psi) |
| --- | --- |
| 0.5 | 9530 |
| 0.5 | 8900 |
| 3.0 | 8870 |
| 0.5 | 8600 |
| 0.5 | 8560 |
| 3.0 | 8530 |
| 0.5 | 8050 |
| 4.0 | 8050 |
| 3.0 | 7950 |

In formation of board structures by the vacuum forming process, it was observed that strengths could be increased from 50 to 100% by pressing the board after reducing the water content below about 10%. This was also observed in extruded ribbon structures as well, but the increase was only 5 to 25%. The pressures applied were about the same as used on vacuum formed board, about 1000 to 2000 psi. Spray dried powders (−200 mesh) have produced higher strengths than −100 mesh ground powders in extrusion experiments. Thus, control of particle size could be a significant factor.

Dry-mixed extrusion batches were kept wet with $H_2O$ (and methocel) while mulling. This process appears to help increase ribbon strengths. The process is probably both a mixing process and a de-airing operation. The latter operation aids in lowering the density of the body. It also prevents formation of bubbles in the ribbon during the extrusion operation.

TABLE IV presents strength measurements made on several different sets of test bars organized in separate groups. The first group of three sets was neither pressed nor was the batch mulled during preparation. The second group of five sets was mulled, but not pressed. The third and fourth groups of two sets each were all pressed, but only the fourth group was mulled.

TABLE IV

| Group | Pressed | Mulled | Average MOR (psi) |
| --- | --- | --- | --- |
| 1 | No | No | 5500 |
| 1 | No | No | 6100 |
| 1 | No | No | 6500 |
| 2 | No | Yes | 7100 |
| 2 | No | Yes | 9500 |
| 2 | No | Yes | 8100 |
| 2 | No | Yes | 7500 |
| 2 | No | Yes | 8000 |
| 3 | Yes | No | 6900 |
| 3 | Yes | No | 4600 |
| 4 | Yes | Yes | 8600 |
| 4 | Yes | Yes | 8900 |

Addition of unexchanged lithium fluorhectorite dispersion to the extrusion batches (especially where inert fillers are present in high levels) would result in greater binding action when subsequently exchanged by cations such as potassium, etc. Small amounts of gel may not need additional exchange—obtaining their exchange by excess K+ in the exchanged floc.

The surface charges (positive on edges and negative on top and bottom surfaces) lend themselves to unique dispersion techniques for active, high surface area catalysts as evidenced by colloidal gold attachment to positive edges.

RELATED LITERATURE

It is believed that the most closely related literature is comprehended by the Beall et al. patent and the Bureau of Mines bulletin, both mentioned earlier, and by the various references made of record in these two sources.

We claim:

1. A method of making sintered, thick-walled, crystalline ceramic bodies of various configurations which comprises the steps of:
  (a) forming a synthetic lithium and/or sodium, water-swelling mica body, the predominant crystal phase of the mica being fluorhectorite, boron fluorphlogopite, solid solutions of fluorhectorite and boron fluorphlogopite, and solid solutions between fluorhectorite or boron fluorphologopite and species structurally compatible therewith selected from the group of talc, fluortalc, polylithionite, fluorpolylithionite, phlogopite, and fluorphlogopite;
  (b) contacting said body with a polar liquid for a time sufficient to cause swelling and disintegration thereof accompanied with the formation of a gel;
  (c) contacting said gel with a source of large cations selected from the group of $K^+$, $Rb^+$, $Cs^+$, $Mg^{+2}$, $Ag^+$, $Cu^+$, $Ca^{+2}$, $Sr^{+2}$, $Ba^{+2}$, $Pb^{+2}$, $H_3O^+$, and organic polycations for a time sufficient to effect an ion exchange reaction between said large cations and $Li^+$ and/or $Na^+$ ions in said gel and to cause flocculation of the gel with the formation of a slurry containing floc aggregates;
  (d) substantially separating the floc from the bulk of the polar liquid;
  (e) shaping the separated floc to a body of a desired geometry; and
  (f) firing said shaped body at a temperature of at least about 850° C., but below about 1100° C., to eliminate hygroscopic behavior of the body and to obtain a sintered, thick-walled, crystalline ceramic body.

2. A method according to claim 1 wherein the synthetic mica body is formed by
  (A) melting a batch for a glass consisting essentially, expressed in weight percent on the oxide basis, of
    (a) 0.5–10% $Li_2O$ and/or 2–10% $Na_2O$, 0.5–14% $Li_2O+Na_2O$, 15–32% MgO, 50–70% $SiO_2$, 0–5% $Al_2O_3$, 0–10% $B_2O_3$, and 4–12% F, where a fluorhectorite is the desired predominant crystal phase, and
    (b) 0.5–6% $Li_2O$, 0–9% $Na_2O$, 0.5–10% $Li_2O+Na_2O$, 20–38% MgO, 2–10% $B_2O_3$, 0–10% $Al_2O_3$, 4–12% $Al_2O_3+B_2O_3$, 35–56% $SiO_2$, and 4–12% F, where a boron fluorphlogopite is the desired predominant crystal phase;
  (B) simultaneously cooling said melt to a temperature at least within the transformation range thereof and forming a glass body therefrom;
  (C) heat treating said glass body at a temperature between 700°–1200° C. for a time sufficient to cause the development of crystals therein of a lithium and/or sodium water-swelling mica selected from the group of fluorhectorite, boron fluorphlogopite, and solid solutions therebetween as the predominant crystal phase.

3. A method according to claim 1 wherein the synthetic mica body is formed by
  (A) melting a batch for a glass consisting essentially, expressed in weight percent on the oxide basis, of
    (a) 0.5–10% $Li_2O$ and/or 2–10% $Na_2O$, 0.5–14% $Li_2O+Na_2O$, 15–32% MgO, 50–70% $SiO_2$, 0–5% $Al_2O_3$, 0–10% $B_2O_3$, and 4–12% F, where a fluorhectorite is the desired predominant crystal phase, and
    (b) 0.5–6% $Li_2O$, 0–9% $Na_2O$, 0.5–10% $Li_2O+Na_2O$, 20–38% MgO, 2–10% $B_2O_3$, 0–10% $Al_2O_3$, 4–12% $Al_2O_3+B_2O_3$, 35–56% $SiO_2$, and 4–12% F, where a boron fluorphlogopite is the desired predominant crystal phase;
  (B) simultaneously cooling said melt to a temperature between about 900°–1050° C. to shape the melt into a glass body and cause phase separation and nucleation to take place therein;
  (C) further cooling said glass body to a temperature between about 700°–900° C. and maintaining that temperature for a time sufficient to effect the development of crystals therein of a lithium and/or sodium water-swelling mica selected from the group of fluorhectorite, boron fluorphlogopite, and solid solutions therebetween as the predominant crystal phase, said body being fully or predominantly crystalline.

4. A method according to claim 1 wherein the synthetic lithium and/or sodium water-swelling mica body is formed by sintering a suitable batch of raw materials.

5. A method according to claim 1 wherein additives are incorporated in the floc, or in the gel from which the floc is formed, prior to separating and forming the floc.

6. The method of claim 1 wherein the slurry containing floc aggregates is subjected to a vacuum filtering step to simultaneously separate the floc from the liquid and to form a filter cake of desired geometry.

7. A method according to claim 6 wherein the shaped filter cake is subjected to a further passing action to improve strength.

8. A method according to claim 7 wherein the shaped filter cake has a water content of about 5% when it is further pressed.

9. The method of claim 1 wherein the slurry containing the floc aggregates is spray dried to form particles that are mixed with a binder and dry pressed to desired shape.

10. A method according to claim 1 wherein the floc is washed and separated from the polar liquid, then redispersed to provide a slurry containing 5 to 20% solids.

11. A method according to claim 1 wherein the floc is washed, separated from the polar liquid, converted to relatively dry particulate form, redispersed to form a homogeneous batch that is extruded in a desired geometry.

12. A method according to claim 11 wherein the dried floc is mixed with methyl cellulose as a binder.

13. A method according to claim 1 wherein the slurry is cast in a mold and allowed to dry.

14. A method according to claim 1 wherein the shaped body is fired at a temperature of 850°–950° C.

15. A method of making sintered, thick-walled, crystalline ceramic bodies of various configurations which comprises the steps of:
- (a) forming a synthetic lithium and/or sodium, water-swelling mica body, the predominant crystal phase of the mica being fluorhectorite, boron fluorphlogopite, solid solutions of fluorhectorite and boron fluorphlogopite, and solid solutions between fluorhectorite or boron fluorphologopite and species structurally compatible therewith selected from the group of talc, fluortalc, polylithionite, fluorpolylithionite, phlogopite, and fluorphlogopite;
- (b) contacting said body with a polar liquid for a time sufficient to cause swelling and disintegration thereof accompanied with the formation of a gel;
- (c) contacting said gel with a source of large cations selected from the group of $K^+$, $Rb^+$, $Cs^+$, $Mg^{+2}$, $Ag^+$, $Cu^+$, $Ca^{+2}$, $Sr^{+2}$, $Ba^{+2}$, $Pb^{+2}$, $H_3O^+$, and organic polycations for a time sufficient to effect an ion exchange reaction between said large cations and $Li^+$ and/or $Na^+$ ions in said gel to cause flocculation of the gel with the formation of a slurry containing floc aggregates;
- (d) separating the floc from the polar liquid and drying;
- (e) mixing the dry floc with a low temperature frit;
- (f) shaping the mixture of floc and frit into a body of a desired geometry; and
- (g) firing said shaped body at a temperature of at least about 700° C. and up to about 1100° C., to eliminate hygroscopic behavior of the body and to obtain a sintered, thick-walled, crystalline ceramic body.

* * * * *